United States Patent [19]
Gilleo

[11] Patent Number: 6,017,983
[45] Date of Patent: *Jan. 25, 2000

[54] COLOR INDICATOR FOR COMPLETION OF POLYMERIZATION FOR THERMOSETS

[75] Inventor: Ken Gilleo, Chepachet, R.I.

[73] Assignee: Alpha Metals, Inc., Jersey City, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,163

[22] Filed: Jan. 29, 1998

[51] Int. Cl.⁷ .............................. C08L 63/00; B41M 5/20
[52] U.S. Cl. ........................... 523/442; 156/64; 156/330; 503/209; 524/789; 524/790; 525/524; 525/533
[58] Field of Search ..................... 156/64, 330; 523/442; 503/209; 525/524, 533; 524/789, 790

[56] References Cited

U.S. PATENT DOCUMENTS

| | | | |
|---|---|---|---|
| 5,314,859 | 5/1994 | Takahashi et al. | 503/207 |
| 5,384,303 | 1/1995 | Mishimura et al. | 503/209 |
| 5,425,824 | 6/1995 | Marwick | 156/64 |
| 5,476,884 | 12/1995 | Kayaba et al. | 528/27 |

*Primary Examiner*—Randy Gulakowski
*Attorney, Agent, or Firm*—Mintz, Levin, Cohn, Ferris, Glovsky and Popeo, P.C.

[57] ABSTRACT

An indicator for complete polymerization and cure of base-catalyzed epoxy thermoset resin systems is disclosed. In particular, the present invention makes use of an diazo dye having amino groups which forms a salt or complex with hardeners used in various epoxy resin systems. Upon full polymerization and consumption of the hardener, a chromophoric shift of the dye can be observed.

25 Claims, No Drawings

COLOR INDICATOR FOR COMPLETION OF POLYMERIZATION FOR THERMOSETS

FIELD OF THE INVENTION

The present invention relates to underflow materials for use in the fabrication of electronic devices. More particularly, the present invention relates to an underflow material comprising a thermoset which undergoes a color change upon polymerization.

BACKGROUND OF THE INVENTION

In the electronics industry, electrical components such as resisters, capacitors, inductors, transistors, integrated circuits, chip carriers and the like, are typically mounted on circuit boards in one of two ways. In the first way, the components are mounted on one side of the board and leads from the components extend through holes in the board and are soldered on the opposite side of the board. In the second way, the components are soldered to the same side of the board upon which they are mounted. These latter devices are said to be "surface-mounted."

Surface mounting of electronic components is a desirable technique in that it may be used to fabricate very small circuit structures and lends itself well to process automation. One family of surface-mounted devices, referred to as "flip chips", comprises integrated circuit devices having numerous connecting leads attached to pads mounted on the underside of the device. In connection with the use of flip chips, either the circuit board or the chip is provided with small balls of solder positioned in locations which correspond to the pads on the underside of each chip and on the surface of the circuit board. The chip is mounted by (a) placing it in contact with the board such that the solder balls become sandwiched between the pads on the board and the corresponding pads on the chip; (b) heating the assembly to a point at which the solder is caused to reflow (i.e., melt); and (c) cooling the assembly. Upon cooling, the solder hardens, thereby mounting the flip chip to the board's surface. Tolerances in devices using flip chip technology are critical, as the spacing between individual devices as well as the spacing between the chip and the board is typically very small. For example, spacing of such chips from the surface of the board is typically in the range of 0.5–3.0 mil and is expected to approach micron spacing in the near future.

One problem associated with flip chip technology is that the chips, the solder and the material forming the circuit board often have significantly different coefficients of thermal expansion. As a result, differing expansions as the assembly heats during use can cause severe stresses, i.e., thermomechanical fatigue, at the chip connections and can lead to failures which degrade device performance or incapacitate the device entirely.

In order to minimize thermomechanical fatigue resulting from different thermal expansions, thermoset epoxies have been used. Specifically, these epoxies are used as an underflow material which surrounds the periphery of the flip chip and occupies the space beneath the chip between the underside of the chip and the board which is not occupied by solder. Such epoxy systems provide a level of protection by forming a physical barrier which resists or reduces different expansions among the components of the device.

Improved underflow materials have been developed in which the epoxy thermoset material is provided with a silica powder filler. By varying the amount of filler material, it is possible to cause the coefficient of thermal expansion of the filled epoxy thermoset to match that of the solder. In so doing, relative movement between the underside of the flip chip and the solder connections, resulting from their differing coefficients of thermal expansion, is minimized. Such filled epoxy thermosets therefore reduce the likelihood of device failure resulting from thermomechanical fatigue during operation of the device.

Despite the advantages of using filled epoxy thermosets, a problem still exists in that it is very difficult to determine when the epoxies have completely cured (i.e., polymerized). This inability to determine complete polymerization represents an obstacle to simplifying and automating the manufacturing process. Thus, a need exists for a filled epoxy thermoset adapted to allow a determination of polymerization during a circuit manufacturing process.

SUMMARY OF THE INVENTION

The present invention relates to a color indicator for use with epoxy thermoset adhesives and particularly for use with filled epoxy thermoset adhesives. More specifically, the present invention relates to the use of a diazo dye that is believed to form a salt or other complex with acid anhydrides and acts as a color indicator for the specified thermoset adhesives. The resulting salt or other complex produces a chromophoric shift in the dye which is indicative of the amount of acid anhydride, and hence the degree of cure, of the material. In one preferred embodiment, Ethyl Red, chemical name: 2-(4-diethylaminophenylazo)benzoic acid, is used as the color indicator. That dye has a deep red appearance when present in environments containing acid anhydrides, yet forms a yellow to amber color when present in environments lacking acid anhydrides, such as fully cured epoxy resins.

Thus, the present invention relates to a thermosetting adhesive which comprises at least one epoxy resin, an anhydride hardener, and a dye which indicates the presence of the anhydride hardener and which changes color in the absence of the anhydride hardener. The invention also relates to a method for determining the completion of cure of an anhydride/epoxy resin system, which method comprises the steps of providing a thermosetting adhesive reaction mixture having a) at least one epoxy resin, b) an anhydride hardener, and c) a dye which indicates the presence of the anhydride hardener and which changes color in the absence of the anhydride hardener; maintaining the reaction mixture at a temperature at which the resin system can cure; and detecting a change in color of the resin system that is indicative that the resin system is substantially completely cured.

DETAILED DESCRIPTION OF THE INVENTION

Many commercial adhesives, sealants and encapsulation materials are based on the use of thermoset polymerization. Typically, such systems use epoxy materials which start as liquids or pastes and are converted to permanent solids during a polymerization, or curing, process. The ability to determine when an epoxy resin has become fully cured is important because epoxy thermoset systems typically solidify to solids with inferior properties prior to polymerizing completely to high performance, fully polymerized materials. Thus, the conversion of the material from a liquid or paste form to a solid is not in and of itself, a good indication of the completeness of the polymerization reaction.

Additionally, device manufacturing methods give rise to other difficulties in determining when a cure is completed.

For example, many processes use conveyor ovens which make it difficult to observe the boards during processing and which allow different types of circuit boards to be processed simultaneously. Different boards may have different heating rates which result in different times needed to achieve completion of the cure. Also, temperature control and measurement in conveyor ovens tends to be more difficult than in conventional ovens.

The present invention relates to the discovery of particular color indicators for use in epoxy thermoset systems that undergo an endpoint color change, thereby visually signaling the completion of the cure. Since, the color change has been found to occur near the end of polymerization, it signals that the material is completely cured. For example, if the resin system has simply gelled to a solid, but not fully hardened by polymerization, no color change occurs; whereas upon completion of the curing (i.e., full curing) a significant color change indicates that curing is complete.

The desired color change displays a high contrast between the starting point and the end point and is therefore easily distinguished on a production line. Additionally, it is important that the color is provided by a cure indicator which comprises a very small proportion of the overall material and does not alter the properties of the thermoset resin once the resin is fully cured.

In connection with the present invention, various pH indicators were added to an epoxy-acid anhydride resin system of the type typically used in the electronics industry for encapsulating electronic devices. Generally, no color change was found to occur. This was surprising, since it was assumed that the acid anhydride would produce a pH that was low enough to shift common indicators toward their acid colors. Thus, by a lack of a color change under these conditions, it was indicated that the route to polymerization was not obvious. Table 1 below includes a list of common pH indicators that do not show a color change when used in base-catalyzed epoxy systems, such as anhydride-epoxy systems and imidazole-epoxy systems.

TABLE 1

| pH Indiator | Starting Color | Color on Polymerization |
|---|---|---|
| chlorophenol red | orange | orange |
| bromothymol blue | yellow | yellow |
| methyl yellow | yellow | yellow |
| phenolphthalein | clear | clear |
| thymolphthalein | yellow | yellow |
| phenol red | red | red |
| naphtholbenzene | yellow | yellow |
| 4-amino-1,1'-azobenzene-3,4-disulfonic acid, sodium salt | yellow | yellow |
| reactive orange | red-brown | red-brown |
| metanil yellow | yellow | yellow |
| ethyl orange, sodium salt | yellow-orange | yellow-orange |
| Sudan III | red | red |

Although the pH indicators shown above do not show a color change, the present invention has unexpectedly identified dyes that appear to form salts or complexes with hardeners used in based-catalyzed epoxy systems such as anhydride/epoxy systems. In contrast to pH indicators, these indicators have unexpectedly been found to produce the desired color change. In particular, diazo dyes having amino groups have been found to undergo a color change when used in connection with anhydride-epoxy resin systems. Although not wishing to be bound by any particular theory, it is believed that the anhydride forms a salt or complex with the dye, wherein the salt or complex displays a particular color. Once most of the anhydride has been consumed during the polymerization process, as the epoxy resin is cured to its full polymerized state, the salt or complex is decomposed and the hardener is consumed, thereby allowing the neutral dye to return to its native color.

It has been observed, using instrumental methods such as differential scanning calorimetry, that the color change end point occurs at approximately the time that the thermoset resin becomes fully polymerized.

A further basis for the belief that the color change is the result of a consumable complex within the resin system is that the polymerization indicator fails to function in the absence of the anhydride hardener or imidazole catalyst. Specifically, when an imidazole catalyst was left out of the resin formula, no color change occurred, even when heat exposure of the resin system was extended. Thus, a polymerization indicator serves as a reliable visual check for incorrect formulations as well as for incorrect time/temperature exposures leading to full polymerization. The incorporation of such a polymerization indicator into resin systems is therefore highly valuable in preventing the incorrect processing of such products. As such, when an incorrect formulation is used, visualization is instantaneous, thereby allowing a production line to be shut down immediately instead of waiting for a lengthy off-line polymer property testing.

As noted above, the preferred polymerization indicator is a diazo dye having a group that will form a salt with acid anhydrides. It has been found that 2-(4-diethylaminophenylazo) benzoic acid forms a deep red composition with anhydrides such as MHHPA. The same dye forms a yellow to amber color when present in fully cured epoxy resins.

Table 2 below provides a typical range of compositions for anhydride-epoxy system incorporating the color indicator dye of the type described above.

TABLE 2

| Epoxy resin BisF type | 5.0–7.5% | by weight |
|---|---|---|
| Epoxy resin cycloaliphatic | 5.0–7.5 | |
| Anhyride hardener | 5.0–20.0 | |
| Imidazole catalyst | 0.04–0.15 | |
| Fused Silica filler | 62.0–75.0 | |
| Color indicator dye | 0.01–0.1 | |

A dye level of approximately 0.05% by weight gives satisfactory results on circuit boards which typically use a green solder mask. The starting and resulting ending colors are very easy to differentiate. Although a lower dye level still provides a noticeable color change, it becomes more difficult to discern on dark colored circuit boards. At a higher level, such as a dye level of approximately 0.1% by weight, color shifted from a very dark red to orange upon complete polymerization of the epoxy resin system. The exact optimum level of dye can be determined based upon the particular color of the substrate to which the epoxy resin system is applied.

EXAMPLES

Example 1

A batch of underfill was made having the following formula:

| Component | % by Weight |
| --- | --- |
| Bis-F Epoxy resin | 6.00 |
| Epoxy-silane surfactant | 0.40 |
| Cycloaliphatic epoxy resin | 8.98 |
| Substituted imidazole catalyst | 0.07 |
| Liquid anhydride hardener | 17.47 |
| Fused silica filler[1] | 66.98 |
| Ethyl Red dye/Indicator[2] | 0.10 |
| TOTAL | 100.00 |

[1]The fused silica filler comprised spherical silica particles, 10–15 microns in diameter.
[2]Ethyl Red dye has the chemical name 2-(4-diethylaminophenylazo)benzoic acid and is CA# 76058-33-8.

The materials were mixed at high speed to ensure complete wetting out and dispersion of the fine silica filler. The resulting color was a deep red.

Example 2

This batch was identical to that of Example 1 with the exception that the amount of Ethyl Red indicator was reduced to 0.05% by weight.

Example 3

This batch was identical to that of Example 1 with the exception that the amount of Ethyl Red indicator was reduced to 0.025% by weight.

Example 4

This batch was identical to that of Example 1 with the exception that the amount of Ethyl Red indicator was reduced to 0.01% by weight.

In each of Examples 1–4 above, the level of the dye/indicator was varied while maintaining the same epoxy/hardener/filler composition. This allowed the optimum dye concentration for a high contrast color change to be determined.

Small samples, each about 4–5 grams, of the materials made in Examples 1–4 were placed on a white alumina substrate and cured in an oven at 150° C. for 30 minutes. The color changes are presented in Table 3 below:

TABLE 3

| Material | Amount of dye | Initial Color | Color after cure |
| --- | --- | --- | --- |
| Example 1 | 0.1% | dark red | dark orange |
| Example 2 | 0.05% | red | yellow-orange |
| Example 3 | 0.025% | red | yellow |
| Example 4 | 0.01% | lighter red | light yellow |

The samples of Examples 2 and 3 showed the greatest color change contrast. The experiment was then repeated on printed circuit boards which had a standard green solder mask. As before, the samples of Examples 2 and 3 showed the greatest color change contrast. The material of Example 2 was selected as the preferred sample since contrast was very good on both the white ceramic substrate and the circuit boards having the green solder mask.

A test of color change versus cure schedule is given in Table 5 below. For the data reported in Table 5, the sample of example 2 (0.05% by weight dye was used). In the data reported in Table 5, experiments were conducted to determine the end point color change. A typical complete cure schedule requires about 15 minutes at about 150° C., or about 30 minutes at about 130° C. These results have been confirmed according to data from differential scanning colorimetry (DSC). Table 5 shows that a significant color change occurs only upon completion of the curing process. Partial curing produced only a slight shift in color. Uncured product remained red, while cured product was always yellow.

TABLE 5

| Cure Schedule | Initial color | Final color |
| --- | --- | --- |
| 15 min @ 130° C. | red | red-dark orange |
| 30 min @ 130° C. | red | yellow |
| 10 min @ 150° C. | red | red |
| 15 min @ 150° C. | red | yellow |
| 10 days @ 23° C. | red | red |
| 5 min @ 165° C. | red | red |
| 10 min @ 165° C. | red | yellow |

Experiments were repeated using Kapton polyimide as the substrate. This material is a commercially popular substrate usede in flexible circuitry. When used on the polyimide, the red color of the uncured underfill material was readily apparent. Upon curing, the underfill material turned yellow, blending in with the yellow tan color of the substrate.

Equivalents

From the foregoing detailed description of the specific embodiments of the invention, it should be apparent that a unique color indicator for determining cure in epoxy resin systems has been described. Although particular embodiments have been disclosed herein in detail, this has been done by way of example for purposes of illustration only, and is not intended to be limiting with respect to the scope of the appended claims which follow. In particular, it is contemplated by the inventor that various substitutions, alterations, and modifications may be made to the invention without departing from the spirit and scope of the invention as defined by the claims. For instance, the choice of the particular reaction temperatures is believed to be a matter of routine for a person of ordinary skill in the art with knowledge of the embodiments described herein.

What is claimed is:

1. A thermosetting adhesive which comprises:
   a) at least one epoxy resin;
   b) an anhydride hardener;
   c) an imidazole catalyst; and
   d) a dye which indicates the presence of the anhydride hardener and which changes color in the absence of the anhydride hardener.

2. A thermosetting adhesive as in claim 1 which further comprises a filler.

3. A thermosetting adhesive as in claim 2 which further comprises a wetting agent for the filler.

4. A thermosetting adhesive as in claim 2 wherein the filler comprises particles of a fused silica.

5. A thermosetting adhesive as in claim 4 which further comprises a wetting agent, the wetting agent including an epoxy-silane surfactant.

6. A thermosetting adhesive as in claim 1 wherein the imidazole catalyst comprises a substituted imidazole.

7. A thermosetting adhesive as in claim 1 wherein the epoxy resin comprises a mixture of a BisF epoxy resin and a cycloaliphatic epoxy resin.

8. A thermosetting adhesive as in claim 1 wherein the dye comprises Ethyl Red dye.

9. A thermosetting adhesive as in claim 10 wherein the dye comprises between about 0.01% and 0.1% of the adhesive by weight.

10. A thermosetting adhesive which comprises:
   a) a first epoxy resin comprising BisF epoxy resin;
   b) a second epoxy resin comprising a cycloaliphatic epoxy resin;
   c) a fused silica filler;
   d) an epoxy-silane surfactant;
   e) an imidazole catalyst;
   f) an anhydride hardener; and
   g) a dye which indicates the presence of the anhydride hardener and which changes color in the absence of the anhydride hardener.

11. A thermosetting adhesive as in claim 10 wherein the dye comprises Ethyl Red dye.

12. A thermosetting adhesive as in claim 11 wherein the dye comprises between about 0.01% and 0.1% of the adhesive by weight.

13. A thermosetting adhesive as in claim 11 wherein the BisF epoxy resin comprises between about 5.0% and 7.5% of the adhesive by weight.

14. A thermosetting adhesive as in claim 11 wherein the cycloaliphatic epoxy resin comprises between about 5.0% and 7.5% of the adhesive by weight.

15. A thermosetting adhesive as in claim 10 wherein the anhydride comprises between about 5.0% and 20.0% of the adhesive by weight.

16. A thermosetting adhesive as in claim 10 wherein the filler comprises between about 62.0% and 75.0% of the adhesive by weight.

17. A method for determining the completion of cure of an anhydride/epoxy resin system which comprises the steps of:
   a) providing a thermosetting adhesive reaction mixture which comprises:
      1) at least one epoxy resin;
      2) an anhydride hardener;
      3) an imidazole catalyst; and
      4) a dye which indicates the presence of the anhydride hardener and which changes color in the absence of the anhydride hardener;
   b) maintaining the reaction mixture at a temperature at which the resin system can cure; and
   c) detecting a change in color of the resin system that is indicative that the resin system is substantially completely cured.

18. The method of claim 17 wherein the detecting step comprises observing the resin system change from a red color to an orange or a yellow color.

19. The method of claim 17 wherein the thermosetting adhesive reaction mixture comprises:
   a) a first epoxy resin comprising BisF epoxy resin;
   b) a second epoxy resin comprising a cycloaliphatic epoxy resin;
   c) a fused silica filler;
   d) an epoxy-silane surfactant;
   e) an imidazole catalyst;
   f) an anhydride hardener; and
   g) a dye which indicates the presence of the anhydride hardener and which changes color in the absence of the anhydride hardener.

20. The method of claim 19 wherein the dye comprises Ethyl Red dye.

21. The method of claim 20 wherein the dye comprises between about 0.01% and 0.1% of the adhesive by weight.

22. The method of claim 19 wherein the BisF epoxy resin comprises between about 5.0% and 7.5% of the adhesive by weight.

23. The method of claim 19 wherein the cycloaliphatic epoxy resin comprises between about 5.0% and 7.5% of the adhesive by weight.

24. The method of claim 19 wherein the anhydride comprises between about 5.0% and 20.0% of the adhesive by weight.

25. The method of claim 19 wherein the filler comprises between about 62.0% and 75.0% of the adhesive by weight.

* * * * *